United States Patent [19]

Loose

[11] Patent Number: 4,490,617
[45] Date of Patent: Dec. 25, 1984

[54] OPTICAL WIDTH MEASURING SYSTEM USING TWO CAMERAS

[75] Inventor: Peter W. Loose, Chelmsford, England

[73] Assignee: European Electronic Systems Limited, England

[21] Appl. No.: 210,337

[22] Filed: Nov. 25, 1980

[30] Foreign Application Priority Data

Nov. 26, 1979 [GB] United Kingdom ............... 7940810
Mar. 19, 1980 [GB] United Kingdom ............... 8009285
Mar. 25, 1980 [GB] United Kingdom ............... 8010048

[51] Int. Cl.³ .......................................... G01N 21/86
[52] U.S. Cl. .................................. 250/560; 356/381; 356/386
[58] Field of Search ................. 250/558, 560, 561; 356/1, 4, 386, 387, 381

[56] References Cited

U.S. PATENT DOCUMENTS 3,902,811 9/1975 Altman et al. .................. 356/156
3,941,484 3/1976 Dreyfus .
4,067,652 1/1978 Bohlander .
4,082,463 4/1978 Dehait et al. .................. 356/167

FOREIGN PATENT DOCUMENTS 1275546 5/1972 United Kingdom .
1287956 9/1972 United Kingdom .
1461536 1/1977 United Kingdom .
2001168 1/1982 United Kingdom .

OTHER PUBLICATIONS

Larin & Gurzi, "1978 Industry Applications Society Annual Meeting", pp. 1240—1244.
"Precision Width Gauge For Hot Strip Mill" by Nagao et al., Toshiba Appl. Rep. pp. 1-9, 9A8DO497, cited by applicant-date unknown.

Primary Examiner—William L. Sikes
Assistant Examiner—Darwin R. Hostetter
Attorney, Agent, or Firm—Wigman & Cohen

[57] ABSTRACT

The invention proposes an electro-optical measurement system to be used to measure the width and possibly also the thickness of a strip 14 being rolled. The strip is imaged onto an electro-optical transducer each of which views the whole width of the strip. To compensate for inaccuracies resulting from the imaging system, a calibration of the imaging system is effected by means of a grid of known dimensions. The calibration results are recorded during a setting up process and used by a digital or analogue computer to correct any measurements taken by the imaging system during operation. There is also disclosed an improved technique for edge detection and for processing video data in real time.

9 Claims, 6 Drawing Figures

OPTICAL WIDTH MEASURING SYSTEM USING TWO CAMERAS

The present invention relates to electro-optical distance measurement.

It has already been proposed to measure the length of an object by imaging the object onto, for example, a camera and performing measurements on the image. This method of measurement lends itself particularly to the measurement of the width of a strip being rolled, although it does have numerous other applications.

In one method of measuring the width of a strip being rolled, two cameras are arranged each to view one edge of the strip and the separation of the cameras is controlled by a servo-mechanism in such a manner as to centre the image of the two edges on the respective cameras. The separation of the cameras is then an indication of the width of the strip. Apart from the slowness of the reaction of the servo-control loop, this method of measurement is not sufficiently accurate since the camera supports will expand with temperature and impair the measurement accuracy.

Another and superior measurement system has been developed for the measurement of the width of a strip being rolled which involves the positioning of two cameras vertically one above the other and both simultaneously viewing the two edges of the strip being rolled. In this method, the spacing of the imaging system is fixed and is not critical and the system can operate more rapidly and more accurately than the previously described prior art systems.

However, the system employing two cameras lying vertically one above the other above the edges of the strip to be rolled suffers from the disadvantage that the higher of the two cameras must typically be some six feet above the strip in order to achieve the desired accuracy. Such a clearance has in practice been found to be unacceptable as the system could then interfere with or be damaged by other equipment in the rolling mill.

In accordance with a first aspect of the present invention, there is provided an optical measuring system for measuring the width of a strip being rolled, the system comprising two optoelectrical transducers arranged above the strip and lying on a line transverse to the longer dimension of the strip, each transducer being capable of viewing substantially the entire width of the strip, and a processing unit connected to the electrical outputs of the two transducers to determine the position in space of the upper edges of the two sides of the strip.

During the course of rolling a strip, it is quite possible for one edge of the strip to lift off the bed of the rolling mill or in some cases for the whole of the strip to lift off the bed. Such distortions of the strip would in all known apparatus result in inaccurate readings.

In accordance with a preferred feature of the invention, the processing unit compares the plane joining of two measured edges of the strip with a predetermined reference plane and if the planes are not coincident is operative to apply a correction to the positioning of the measured edges so as to evaluate the corresponding measured width of the strip had it been lying in said reference plane.

In calibrating a system as above described, it is convenient to position a reference grid in the reference plane and to generate from a comparison of the measured positions of the grid with the actual known positions of the lines on the grid a correction factor to be applied by the processing unit at the various viewing angles of the transducer optical system. Preferably, a second calibration is performed with a grid positioned at a predetermined height above the reference plane so as to enable a correction to be applied at any point on or above the bed of the rolling mill.

In any system relying on optical imaging, efficiency of the system depends upon the quality of the optics which serve to image the object onto the plane of the opti-electrical transducer, be it a television camera or a charge coupled device. Measurements are normally carried out at the extremities of the field of view where the image quality is always at its poorest and the cost of high quality optical systems has hitherto limited the accuracy of such measuring systems.

According to a feature of the present invention, the optical measuring system has two opto-electrical transducers and two optical imaging systems for imaging an object to be measured onto the transducers and a processing unit connected to the electrical outputs of the transducers for modifying the output of the transducer in accordance with a predetermined correct function to compensate for any inaccuries caused by the optical system.

This embodiment may be considered as providing electronic compensation for inaccuracies introduced by the optical system.

In order to determine the correction function, the system may be calibrated by the measurement of an object or preferably a grid having known dimensions. The measured values obtained with this calibration grid are entered into a microprocessor which may then compute the amount of correction to be applied at different points of the image field by analogue or digital interpolation.

It is preferable to use a charge coupled device as an optoelectrical transducer and in such a case the correction may conveniently be done by reference, in respect of each element of the charge coupled device, to a calibration table stored within a memory of the microprocessor during the calibration process.

Although with a two camera system it is possible to compute the location of the edge from standard trigonometrical computations, digital computers are not well adapted to perform trigonometrical computations at speed and it would prove difficult to perform a real time analysis if the location of the edges were to be worked out trigonometrically.

In accordance with a second aspect of the present invention, there is provided a two camera measuring system which comprises two cameras having overlapping fields of view and a processing unit for determining from the output video signals of the two cameras the position of an object in the common field of view relative to the two cameras, the processing unit comprising a memory in which there is stored a look-up table defining the position of known points in space relative to the cameras in terms of the video signals from the two cameras, the exact position of any point being determined during real time analysis by linear interpolation between the recorded calibration points.

In other words, a grid is formed in space of points at which the video signals are known from precalibration and in real time it is only necessary to compute a minor arithmetic averaging operation in relation to the preestablished calibration grid in order to determine accurately the position of any point falling in the common field of view of the two cameras.

This simplified method of processing is applicable regardless of the relative dispositions of the cameras and the common field of view, thus both cameras may be disposed vertically above one another above the common field of view, the cameras may be disposed side by side above the common field of view or the common field of view may lie near the intersection of the optical axes of the cameras when these are disposed at right angles to one another.

To record the calibration look-up table, it is convenient to employ a calibration grid having lines of known separation arranged at a known distance from the cameras and to enter the video signals directly into the memory. This form of calibration has the advantage that other inaccuracies, as might for, example be caused by the lens system, are automatically compensated in the process.

In order to be able to determine the postion of the edges of a strip accurately, use has been made, for example, of a CCD (charge coupled device) camera having a very large number of sensing elements. This however presents the problem that the analysis of the video information takes a considerable time making it difficult to process all the information in real time. It is thus desirable to be able to process the camera video information in real time without reducing the sensitivity of the scan.

In accordance with a further aspect of the present invention, there is provided a method of analysing the video output signal of a camera to detect the edge of an object in the field of view, which comprises storing the video signal from one scan in a random access memory, determining the location of the points of the scan which cross a predetermined threshold value to the peak value of the video signal, defining areas of interest about each point where the said threshold is crossed and further processing only the portions of the video signal lying within the said areas of interest.

According to a further aspect of the present invention, there is provided an arrangement for processing the video output signal of a camera to determine the edge of an object in the field of view, which comprises a random access memory for storing one scan of video information from the camera, a first processing unit connected to the random access memory for analysing the video information to determine a threshold value corresponding to a probable location of an edge of an object and for detecting where the said threshold value is crossed, and a main processing unit connected to the random access memory and to the first processing unit for selecting from the random access memory the data falling within the areas of interest indentified by the first processing unit and performing a detailed analysis of the video signal within the said areas to locate accurately the edges of objects within the field of view of the camera.

Conveniently, two random access memories are provided which are connected alternately to the camera and to the processing units, the arrangement being such that while video information is written in one of the random access memories the information stored in the other during the preceding scan is analysed by the processing units.

One way of determining the position of the edge of an object is to determine the point of maximum slope of the video signal. However, because the memorised video signal is not continuous being formed, for example, from the signal from individual elements of a sensing array, it is not possible by relying exclusively on this technique to determine the point of maximum slope on the curve with an accuracy greater than one interelement spacing.

In accordance with a further aspect of the invention, there is provided a method of analysing a video signal from a light sensitive array to determine the accurate location of an edge, which comprises determining the position of the elements at which the rate of change of the video signal is a maximum, determining the positions of the elements at which the rate of change of the video signal drops to a predetermined fraction of its maximum rate and determining the position of maximum change to an accuracy exceeding one interelement spacing by averaging the positions at which the rate of change falls to the predetermined fraction of its maximum value.

The invention will now be described further, by way of example, with reference to the accompanying drawings, in which.

Figure 1:
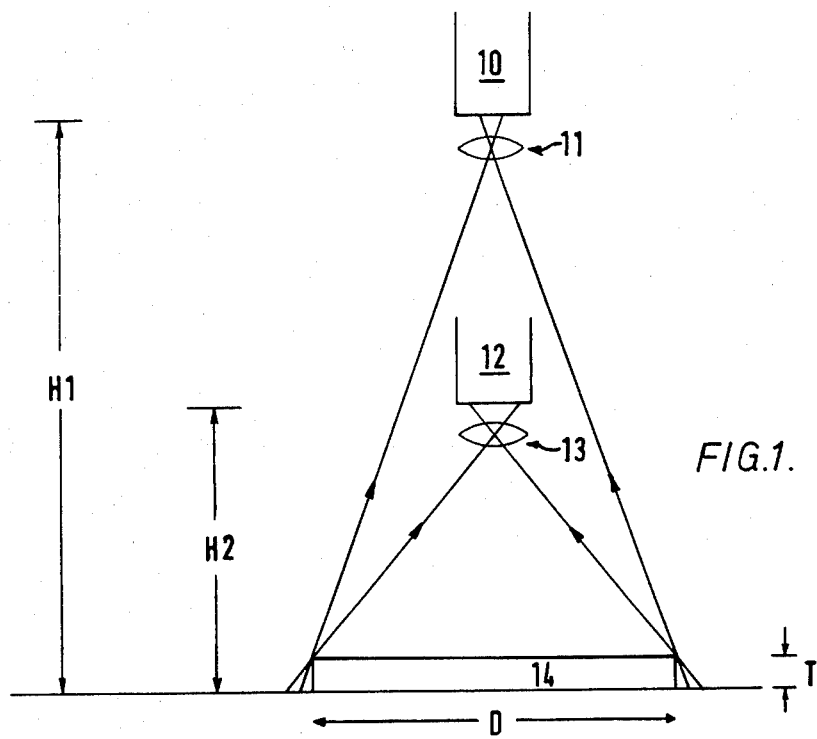
FIG. 1 is a schematic representation of a known electro-optical distance measurement system.

The system shown in FIG. 1 is intended to measure the width D and the thickness T of a strip 14 being rolled. The optical measurement system includes a first charge coupled device 10 mounted with its focussing system 11 a distance H1 above the plane on which the object 14 rests and a second charge-coupled device 12 mounted with its imaging system 13 a distance H2 above the plane on which the object 14 rests. The purpose of the equipment is to measure the width D of the strip 14 and its thickness T. This can be carried out in a known way from the measurements made by the charge-coupled devices 10 and 12.

If the strip 14 is a light emitter or a light reflector, its image can be sensed directly by the charge-coupled devices 10 and 12, but alternatively a light source may be positioned beneath the strip 14 to measure the dimensions of the shadow. Knowing the distances H1 and H2, the sizes of the images on the charge-coupled devices and the magnifications of the imaging systems the dimensions D and T can be computed in a known way.

In the system shown in FIG. 1, the distance H1 may need in some cases to be as much as two meters and this has been found to be inconvenient in certain applications. Furthermore, the measuring system employed in the embodiment of FIG. 1 assumes that the strip 14 being rolled is resting upon the bed of the rolling mill and this in practice may not be the case, it being common for one edge of the strip to lift off.

Figure 2:
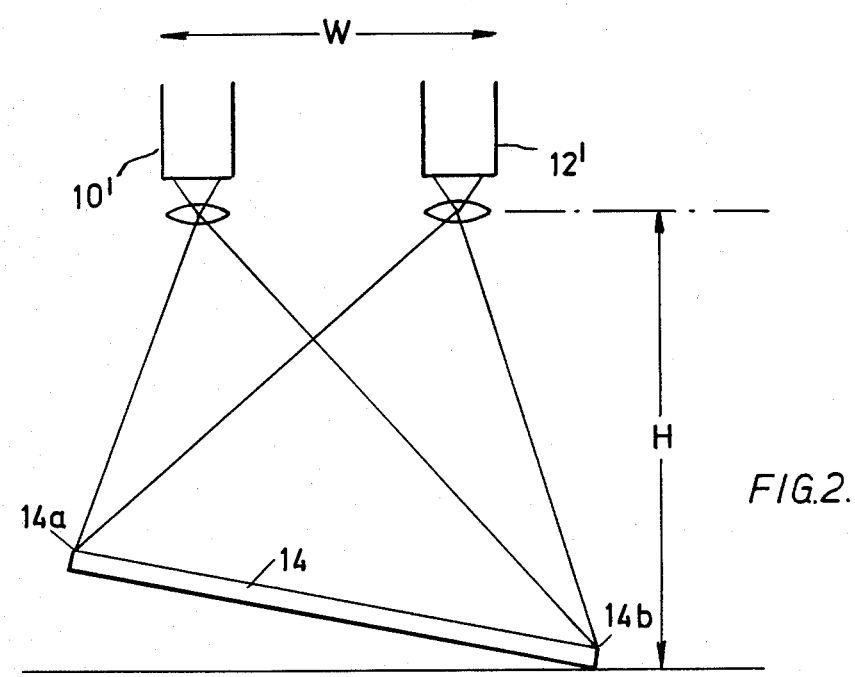
FIG. 2 is a similar representation of a second distance measurement system in accordance with the invention.

The system in FIG. 2, shown very schematically, disposes the two cameras 10' and 12' at a known height H above the bed of the rolling mill and at a known distance W apart. Each of the cameras is capable of seeing both edges of the strip 14 simultaneously. The method of computation in this embodiment, however, differs from that previously described. In place of assuming that the strip 14 is resting on the bed, the location in space of each of the edges 14a and 14b is calculated. This is a simple problem analogous to that solved in any navigation system wherein the location of a point is determined by taking bearings from two known points. Each of the cameras 10' and 12' provides a bearing and the point of intersection is a unique point in space which can readily be calculated.

If the points 14a and 14b are found to lie in a different horizontal plane from one another, the distance between the points 14a and 14b is determined within conventional analytical geometry and it is then possible to complete the co-ordinates of the edges 14a and 14b if the strip is bent back to assume a horizontal position resting on the bed.

The accuracies of the measurements in any system depend on the quality of the optical systems 11 and 13 which are shown only schematically in the drawings as consisting of a convex lens each. The cost of very high quality optics is extremely high and consequently the accuracy of the measurement is limited by the qaulity of the optical systems.

With a view to improving the accuracy of such a system without significantly increasing the cost, it is possible to place a grid in the position of the strip 14 in order to calibrate the system.

To implement this technique, the dimensions of the image produced by lines having a predetermined distance apart are stored in a memory and the contents of the memory are read during operation in order to compensate for inaccuracies in the known system. Such a method of compensation can readily be performed by digital microprocessor but this feature of the invention is not limited to such construction and it is alternatively possible to feed the output of each charge-coupled device to a function generator having a function predetermined during the calibration procedure to correct the inaccuracies resulting from the measurement system. The correction function may simply involve linear interpolation between two points measured during calibration but alternatively the function may be more complicated employing functions of higher orders to form a curve defining a best fit with the points measured during calibration. In the latter case, an analogue computation technique is involved which is believed evident to a person skilled in the art.

As in the embodiment of FIG. 2, readings are not only taken when the strip 14 is resting on the bed, but also when the edges are raised above it, the calibration of the lenses should be performed by placing the calibration grid in more than one horizontal position during the calibration process in order to correct for aberrations in all the different planes of measurement.

Figure 3:
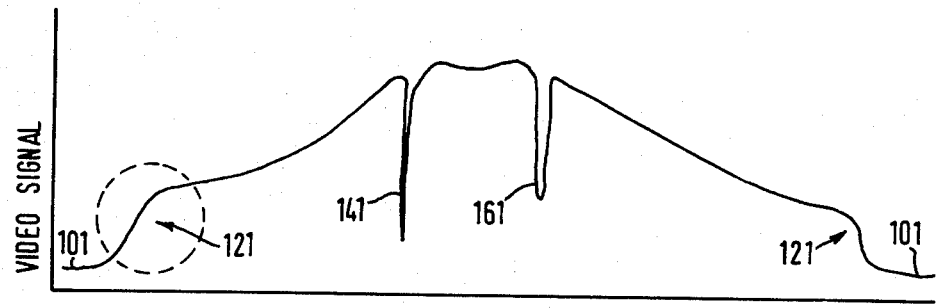
FIG. 3 is a profile of the radiation emitted by a rolled sheet of steel.

There now follows a description of the edge detection; FIG. 3 shows the profile produced on a video camera array when viewing a sheet of rolled steel. The minimum values 101 in the left and right of the graph indicate the background radiation. At the edges 121 the video signal is generally in the form of a half sinusoid with the maximum rate of change corresponding to the edge. The maximum value of the half sinusoidal does not correspond to the maximum radiation since the edge of a rolled strip tends to be cooler than the centre, thus there continues a gradient towards the centre of the strip. The deep spikes 141 and 161 shown are effects of local cooling which can be caused by water droplets and the general profile will itself be affected by the cooling of the press roller. The area of importance for the present application is the part which is circled, that is to say the edge, since it is necessary to detect this edge in order to be able to measure the width of the rolled strip accurately.

Figure 4:
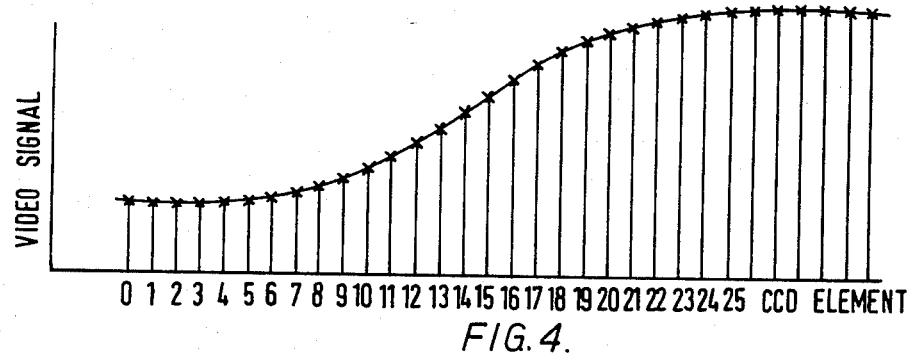
FIG. 4 is a detail of the video signal produced from a video array showing only the part encircled in FIG. 3.

FIG. 4 shows the edge drawn to a much enlarged scale showing the idealised video signal from a charge coupled device viewing the edge. Because the video signal is sampled at spaced intervals, by such an array, the maximum rate of change of the video signal cannot be measured directly to an accuracy in excess of one interelement spacing. Further processing cannot however readily be performed in real time because of the large number of elements in a charge coupled device and therefore it is proposed initially that an area of interest be identified and selected from the whole of the video signal for the purpose of analysis. In the case of the profile in FIG. 3, this can be achieved by measuring the video signal intensity at the top of the half sinusoid and fixing a threshold level equal to say, half this value as indicative of the likely position at an edge. A memory now stores the video signals from the elements of the array immediately adjacent the crossing of this threshold value and stores only such values for further processing. By reducing the number of elements to be analysed in this way, it is possible to perform the analysis in real time.

In the profile shown in FIG. 3, only three areas will be identified as being of interest, two being the true edges 121 of the strip and one being the spike 141 caused by a water droplet. Because of the obvious differences in two signals one can readily distinguish the true edges from such spikes.

To enable detection of the point of maximum rate of change, the two elements at which the rate of change is a maximum are first identified. This could, for example, be the elements numbered 13 and 14 in FIG. 4. Subsequently, the two elements at which the rate of change drops to a quarter of this maximum value are detected by analysing the video signals from the elements on each side of the maximum rate of change. The average of these locations provides a more accurate assessment of the true position of the point of maximum rate of change and therefore the edge of the strip. By experiment, various fractions of the maximum rate of change have been tried, that is to say a quarter, a third, a half, and in each case the averages were in agreement to an accuracy of one tenth of the interelement spacing. The actual fraction adopted is therefore not critical but approximately a quarter has been found to be the most expedient.

It should here be mentioned that the signal shown in FIG. 4 is a signal which has been cleaned from various interfering noises. For example, each charge coupled device has a characteristic random noise associated with it, often termed the signature, as each signature is peculiar to a given device. This signal must first be removed, for example by viewing a neutral background, measuring the noise signal and substracting it from any subsequent measurements made during operation.

It is also inherent in the construction of a charge coupled device that the gain vay vary from one element to the next but that alternate elements are matched. Therefore, to avoid the superimposition of a signal having a wavelength related to the interelement spacing, the signals from alternate elements are analysed separately.

Figure 5:
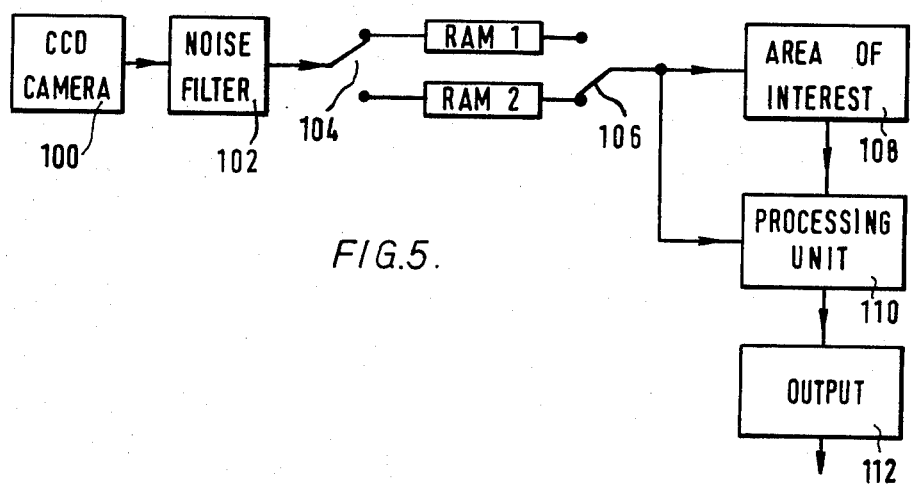
FIG. 5 is a block diagram of an arrangement for accurate edge detection and FIG. 6 shows two cameras arranged above a calibration grid.

In FIG. 5, a charge coupled device camera 100 is connected to a noise filter 102 removes the sources of noise mentioned hereinbefore. The video signal is applied by an electronic switch 104 alternately to two random access memories RAM1 and RAM2. While the signal is being written into RAM1 the video signal from the preceding line is read from RAM2 and vice versa. An area of interest processing unit 108 is connected alternately to the random access memories RAM1 and RAM2 by means of an electronic switch 106 which operates in synchronism with the switch 104. The area of interest circuit 108 determines a threshold which corresponds to likely positions of an edge and enters that information into a main processing unit 110. The main processing unit now examines the video signal in the random access memory in the vicinity of each area of interest in accordance with the principle described above to determine the maximum rate of change of the video signal and after further processing provides an output from an output unit 112.

Figure 6:
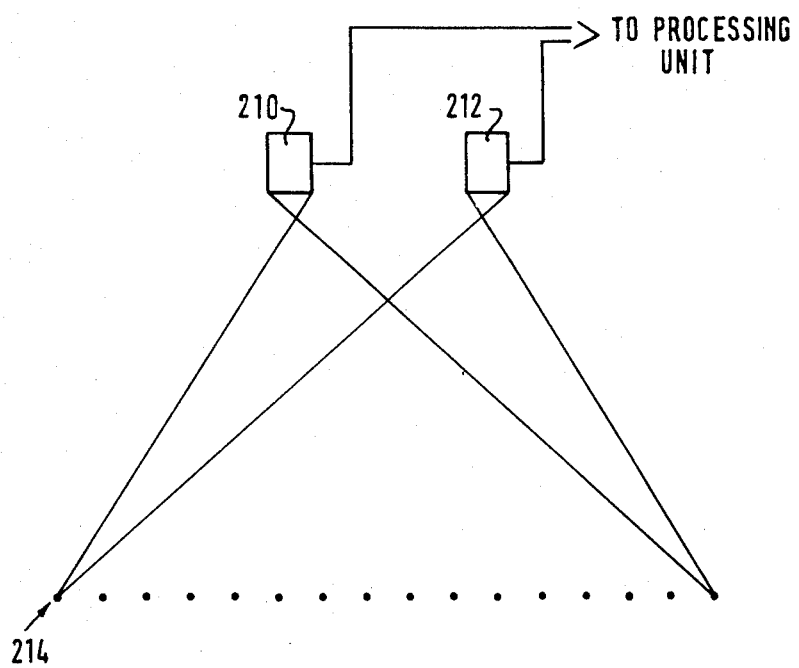

In FIG. 6, two cameras 10 and 12 are arranged side by side one another above a calibration grid 14 which is arranged in a position corresponding to that adopted by a rolled strip when the system is in operation. It is desired to combine the individual outputs of the two cameras of the stereo system without resorting to trigonometrical computations in order to determine the accurate positioning in space of the edges of the strip being rolled.

During the initial setting up of the two camera stereo system, which is connected, as described above to a processing unit serving to determine the accurate positions of the edges of the rolled strip, the calibration grid is placed at an accurately measured position relative to the stereo camera system. The video signals derived during this calibration phase are entered into a memory of the processing unit connected to the cameras so as to form a look-up table assigning to each position known in space from the positioning of the calibration grid two co-ordinates corresponding to the positions on the two cameras on which the image of the said point in space is incident. After recording the pairs of co-ordinates for all the lines on the calibration grid at a first spacing of the grid from the camera, the grid is moved to a new position and a further set of calibration values is determined, this process being continued to form a matrix of points in space for which the co-ordinates (as defined above) are recorded in the memory as a look-up table.

After the calibration of a camera system, which need not be done on site, the processing unit determines the position of an edge during operation by interpolation. Any point falling generally within the matrix of calibration points will fall within a square or rectangle, the corners of which have known co-ordinates. By linear interpolation of the values within that square, involving only simple sums of addition and multiplication which may be done rapidly, it is possible to compute the exact position of the edge when lying at any point falling within the calibration matrix.

I claim:

1. A system for measuring the width of a strip being worked, comprising two arrays of radiation responsive elements constituting two sensors located at a predetermined distance from one another above the strip and each arranged to scan both edge portions of the strip, means for generating from the output of said sensors signals representative of the angular position of each edge of the strip relative to said sensors and means for determining from said signals the spatial positions of said edges relative to said sensors thereby enabling the width of the strip to be evaluated, the evaluated width being independent of any inclination of the plane of the strip relative to the two sensors.

2. A system according to claim 1, wherein said two sensors lie on a line extending substantially perpendicular to the longitudinal dimension of the strip.

3. A system according to claim 2, wherein said means for determining the spatial positions of said edges comprises a memory in which there is stored the spatial positions of said edges for different pairs of values of said signals and a processing unit connected to said memory.

4. A system according to claim 3, wherein the spatial positions of the edges are determined by the processing unit by linear interpolation, when the positions of the said edges do not correspond to the spatial positions stored in the memory.

5. A system according to claim 1, wherein each sensor has an imaging system associated therewith for imaging the strip onto said sensor and a processing unit is connected to the electrical output of each sensor to compensate for optical inaccuracies in accordance with a predetermined correction function.

6. A system according to claim 5, wherein said processing unit is calibrated by employing a grid of known dimensions.

7. A system according to claim 3, wherein the spatial positions stored in the memory are determined by employing a calibration grid.

8. A system according to claim 1, in which said radiation responsive sensor means are video cameras, further comprising a random access memory for storing one scan of video information from each sensor means, a first processing unit connected to the random access memory for analysing the video information to determine a threshold value corresponding to a probable location of an edge of an object and for detecting where the said threshold value is crossed, and a main processing unit connected to the random access memory and to the first processing unit for selecting from the random access memory the data falling within the areas of interest.

9. A system as claimed in claim 8, wherein two random access memories are provided which are connected alternately to the sensor means and to the processing units, the arrangement being such that while video information is written in one of the random access memories the information stored in the other during the preceding scan is analysed by the processing units.

* * * * *